Patented June 17, 1952

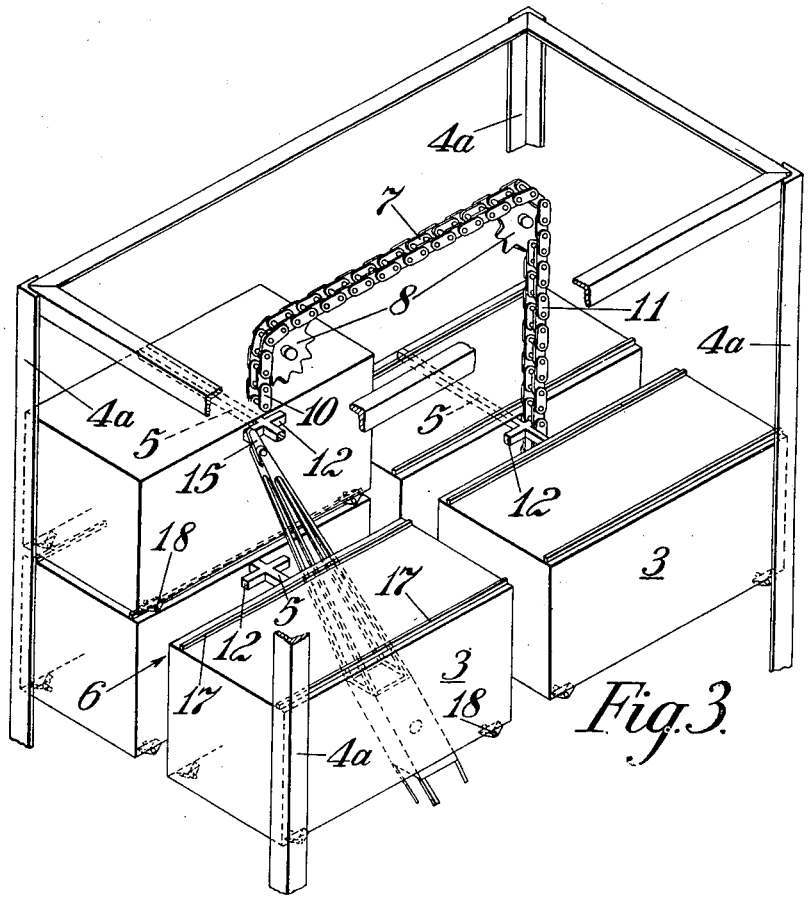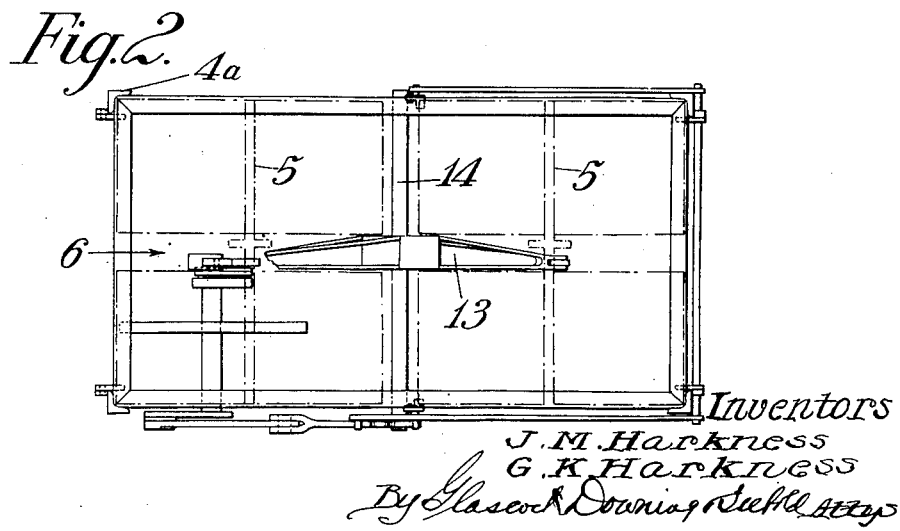

2,600,869

UNITED STATES PATENT OFFICE 2,600,869

TRANSPORTING AND/OR STORING OF GOODS AND THE LIKE

John Maxwell Harkness, Eltham, and George Kettelwell Harkness, Bexley, England, assignors to Eugene O'Sullivan, Chislehurst, England Application May 27, 1948, Serial No. 29,546
In Great Britain April 11, 1947

8 Claims. (Cl. 214—16.1)

This invention relates to the transport and/or storage of goods and the like and has for its object to provide an improved form of conveyor mechanism adapted for the storage and display of goods as a passenger elevator or for the garaging of motor cars of the type comprising two vertical series or columns of containers, or platforms or the like article-supporting means (hereinafter generally referred to as "containers") adapted to be moved stepwise in opposite directions, means being provided for transferring the lowermost container in the descending column and the uppermost container in the ascending column to the respective adjacent column.

According to the invention in a conveyor of the type described a rotary actuating device is provided which is adapted to impart a reciprocating motion to means for moving the columns stepwise, and an oscillating motion to means for transferring containers from one column to the other column, said transfer taking place during a rest period of the columns.

The containers may be detachably connected to endless flexible elements (or element) such as chains (or chain) and the stepwise movement to the columns may be effected by imparting a movement to said elements (or element) through a movement of the uppermost container in the ascending column.

The rotary actuating device may comprise a crank disc or arm to which the reciprocating motion means and the transferring means are operatively connected.

The transferring means may comprise a pivotally mounted lever or arm the ends of which are adapted to engage abutments on the containers.

The reciprocating motion means may comprise a pawl lever mounted for rectilinear movement and operatively coupled to the crank disc said pawl being adapted to engage the container abutment.

The containers may be arranged in pairs having a common chain engaging device mounted therebetween, the containers being spaced apart laterally to provide a space accommodating pivoted arm and pawl lever and conveying chain. The containers may be provided with rails on the upper surface and rail engaging wheels or rollers whereby a container in its transfer at the upper ends of the columns will be supported by the containers immediately below.

In the accompanying drawings:

Figure 2 is a plan,

Figure 3 is a perspective view, parts being broken away, of the upper end of the conveyor.

Figure 1:
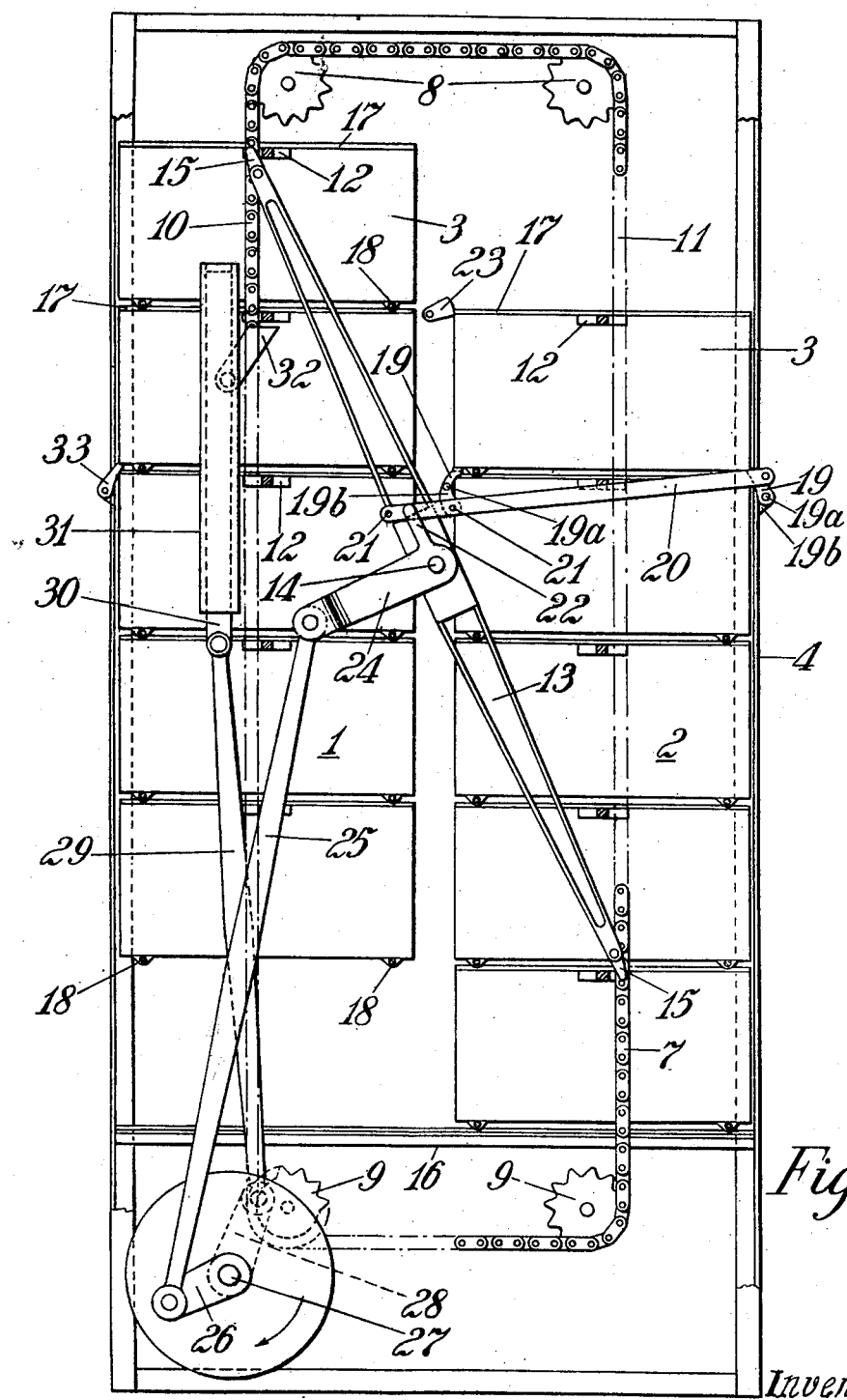
Figure 1 is an elevation of a conveyor according to the invention.

In carrying the invention into effect according to one convenient mode by way of example two vertical series or columns 1 and 2 of containers 3 are arranged side by side in a well or enclosing casing 4 which may include upright angles 4a at the corners. The containers 3 may be of any appropriate shape and dimensions according to the purpose of the lift. Thus they may be of square or rectangular shape in plan and elevation and open ended or sided, or simply in the form of platforms open all round.

Any suitable number of containers may be provided in each series or column according to their dimensions and the depth of the well or casing 4. The main series of containers in each column are opposite one another, there being one container at the bottom of the descending column 2 and one at the top of the ascending column 1 opposite spaces in the other column.

It is preferred that the containers are arranged in pairs spaced apart laterally but rigidly connected to each other by a horizontal transverse bar 5 so that each pair moves as a unit.

The containers 3 are supported by endless conveyor means located in the space 6 between the pairs forming the units. Such conveyor means may comprise a sprocket chain 7 which is mounted upon two upper and two lower sprocket guide wheels 8 and 9 respectively so that there is an ascending lap 10 and a descending lap 11 of the chain, such laps being located about midway of the length of the containers.

Each transverse bar 5 connecting a pair of containers is provided with a short cross bar forming a pair of pins 12 located in the space 6 between the two containers. The ends of this cross bar are adapted to engage in the spaces of the links of the chain, whereby the containers are supported by the chain.

It will be appreciated that there are equal numbers of containers in the ascending and descending columns corresponding to the vertical laps of the chain so that there is a balance or substantial balance whereby little effort will be required to advance the conveyor chain step by step.

For the purpose of transferring a container at the bottom of the descending column 2 to the adjacent column 1, and the container at the top of the ascending column 1 to the adjacent column 2, an oscillating arm or lever 13 is provided in the space 6 between the pair of containers. This lever 13 is secured at its mid-position upon a rock shaft 14 located between the columns.

Suitable rotary means are provided for rocking the shaft 14 to oscillate the lever 13.

The ends of the lever are adapted to lie to the rear of the transverse bars 5 of the containers to be transferred which bars act as abutments for the lever. Upon oscillating the lever 13 the cross bars or pins 12 of the containers to be transferred are removed from the chain and the containers moved from one column to the other so that the cross bars or pins 12 are engaged in spaces of links of the other lap of the chain.

In order that the ends of the lever 13 may move to the rear of the transverse bars 5 they are provided with spring controlled pawls 15 pivoted to the lever 13 so that they will pass the bars in one oscillation of the lever but are rigid for the driving or transferring movement.

During their transfer the upper container 3 may be supported by the next lower containers, while the bottom container may engage rails or tracks 16 in the enclosing structure or casing.

In connection with transfer from the upper ends of the columns the containers may be provided with rails 17 upon their upper surface upon which rollers or wheels 18 carried by the containers may run. The rollers or wheels 18 also engage the rails 16 at the bottom transfer.

In order to hold steady the containers 3 at the top of the descending column while a container from the ascending column is being moved across, pivotally mounted pawls 19 are adapted to engage the base of the containers at the ends or outer corners thereof. The pawls 19 are mounted upon spindles 19a which carry arms 19b. The arms 19b are coupled to a link 20 provided with a pair of spaced pins 21. Between the pins 21 an arm 22 of a bell crank lever is adapted to lie, the bell crank lever being secured upon the rock shaft 14. The spacing between the pins 21 is such that the pawls 19 are into and out of their container-engaging position just prior to the ends of the oscillating movement of the lever 13. The other arm 24 of the bell crank lever is connected by a coupling rod 25 to the crank arm 26 secured to the shaft 27.

For the purpose of maintaining the transferred container at the upper end of the column 2 when no longer under control of the lever 13 a spring controlled pawl (or pawls) 23 is located in a position to engage the container as it comes to rest in the transferred position.

The shaft 27 carries a second crank arm 28 which is connected by the coupling rod 29 to a reciprocating bar 30, which is movable in guides 31 alongside the upwardly moving chain lap. The bar 30 is provided with a pivotally mounted tooth 32 adapted to engage one of the transverse bars 5 on the containers during its upward reciprocation and thus impart motion to the chain and the remainder of the containers. The tooth 32 is pivoted to the reciprocating bar 30 and is spring controlled so that it will pass the transverse bar 5 in the return movement of the bar 30.

A check pawl 33 engaging a container may be provided for preventing the chain moving in the reverse direction.

The shaft 27 may be driven through any suitable prime mover such as an electric motor through appropriate reduction gearing.

In operation, assuming the containers 3 to be in the position shown in Figure 1, the movement of the shaft 27 in a clockwise direction will rock the shaft 14 through the crank arm 26, link 25 and lever arm 24. The transfer arm 13 will thus move clockwise and transfer a container 3 from the top of column 1 to column 2, and a container from the bottom of column 2 to column 1. At the same time, bar 30 with the pawl 32 will be descending to engage the bar 5 of a lower container.

During the return oscillation of the transfer arm 13 the bar 30 will be moved upwardly driving the chain 7 and causing the column 1 to ascend and column 2 to descend.

The loading and unloading of the containers 3 may take place at any desired level at which suitable doors will be provided in the wall of the well.

In order that any particular container may be moved to the exit position suitable electro mechanical means may be provided whereby on pressing the appropriate button a circuit is made by which the transferring and travelling mechanism is operated until the appropriate container is at the exit position.

Means may be provided for causing reverse movement of the column movement and transfer.

Instead of double container units, single containers may be provided but in such case it may be desirable to have duplicate chains and lever control means between which the containers are located.

The improved conveyor means according to the invention is adaptable for the garaging of cars and for the storage of goods such as merchandise or furniture and also for the accommodation of goods in ships holds. It may also be utilised for displaying goods in containers of an appropriate size. It may also be used as a passenger or service elevator with suitable automatic door accommodation.

We claim:

1. In a conveyor for raising and lowering containers, the combination of a casing; four sprocket wheels journaled in said casing; a sprocket chain mounted on said wheels, said wheels being so disposed that they define a substantially rectangular path of travel of said chain, having a vertical ascending lap, a vertical descending lap, said laps being relatively spaced, an upper horizontal lap and a lower horizontal lap, said horizontal laps being intermediate said vertical laps at their upper and lower ends at the top and the bottom of the casing, respectively; a plurality of containers, each having supporting rollers on its bottom and guide tracks on its top, and a pair of pins adapted to engage said vertical laps of said chain, respectively; guide rails mounted in said casing adjacent the lower ends of said vertical laps of said chain; means for intermittently moving said chain, for raising and lowering said containers, each movement of said chain bringing an ascending container and a descending container into horizontal alignment upon stoppage of the chain; and means operative when the chain has been stopped for moving each container horizontally, when a container has been lowered to the bottom of the casing, on the casing rails from the descending to the ascending lap of the chain, and, when a container has been raised to the top of the casing, on the rails of a pair of its immediately inferior horizontally aligned containers from the ascending to the descending lap of the chain.

2. A conveyor, according to claim 1, in which said chain moving means consists in a vertically reciprocatable member adapted on its upward strokes to engage said containers, serially, when said containers have been moved to engage the ascending lap of said chain.

3. A conveyor, according to claim 1, having a driving shaft operatively connected with said chain moving means and said means for moving said containers horizontally.

4. A conveyor, according to claim 1, in which said means for moving said containers horizontally consists in a double lever pivoted in said casing, its opposite ends simultaneously moving two containers which have been raised to the top of the casing and lowered to the bottom of the casing, respectively.

5. A conveyor, according to claim 1, in which said containers are arranged in laterally spaced pairs, the containers of each pair being disposed on opposite sides of the chain and having common pins for engaging the chain.

6. In a conveyor for raising and lowering containers, the combination of ascending and descending vertically-movable columns of containers, an endless chain having ascending and descending laps associated with said columns, respectively, pairs of pins on said containers for coupling said containers with the ascending and descending laps of said chain, means for imparting to said chain an intermittent progressive motion to raise stepwise the containers in the ascending column and to lower stepwise the containers in the descending column, said means including a rotary driving shaft, a reciprocable actuating element, means for converting a continuous rotation of said driving shaft into a reciprocating movement of said actuating element and means connecting said actuating element with said chain whereby movement of said actuating element in one direction imparts a corresponding movement to the chain, the return movement of said actuating element being an idle stroke, and means being provided driven from said driving shaft and synchronized to operate during the return movement of said actuating element to transfer the uppermost container of the ascending column to the top of the descending column and simultaneously to transfer the lowermost container of the descending column to the bottom of the ascending column.

7. In a conveyor for raising and lowering containers, the combination of ascending and descending columns of containers, a chain having ascending and descending laps associated with said columns respectively, elements on said containers for coupling said containers with the ascending and descending laps of said chain and with vertically adjacent containers in contact with one another, means for imparting to said chain an intermittent progressive motion to raise stepwise the containers in the ascending column and to lower stepwise the containers in the descending column, and means synchronized to operate during the periods when said chain is stationary to move the uppermost container of the ascending column solely horizontally along the top surface of its underlying container to the top of the descending column and to move the lowermost container of the descending column solely horizontally to the bottom of the ascending column.

8. In a conveyor for raising and lowering containers, the combination of ascending and descending columns of containers, a chain having ascending and descending laps associated with said columns respectively, elements on said containers for coupling said containers with the ascending and descending laps of said chain, means for imparting to said chain an intermittent progressive motion to raise stepwise the containers in the ascending column and to lower stepwise the containers in the descending column, and means synchronized to operate during the periods when said chain is stationary to transfer the uppermost container of the ascending column to the top of the descending column and to transfer the lowermost container of the descending column to the bottom of the ascending column, the last-named means including a double-ended pivoted lever having elements at its upper and lower ends for engagement with the uppermost container of the ascending column and with the lowermost container of the descending column, respectively, and means synchronized with the operation of said chain for reciprocating said lever such that when said lever makes a stroke in one direction it simultaneously transfers said uppermost and lowermost containers between said columns during the time said chain is stationary, the return stroke of said lever, which is made while the chain is moving, being an idle stroke.

JOHN MAXWELL HARKNESS.
GEORGE KETTELWELL HARKNESS.

REFERENCES CITED

The following references are of record in the file of this patent:

UNITED STATES PATENTS

| Number | Name | Date |
|---|---|---|
| 592,967 | Freeman | Nov. 2, 1897 |
| 1,871,795 | James | Aug. 16, 1932 |
| 1,965,161 | Sheflin | July 3, 1934 |
| 1,980,850 | Clark | Nov. 13, 1934 |

FOREIGN PATENTS

| Number | Country | Date |
|---|---|---|
| 467,061 | Great Britain | June 10, 1937 |